Jan. 18, 1938. D. R. DE TAR 2,106,088
DRIVE MECHANISM
Filed May 8, 1936

Inventor:
Donald R. DeTar,
by Harry E. Dunham
His Attorney.

Patented Jan. 18, 1938

2,106,088

UNITED STATES PATENT OFFICE 2,106,088

DRIVE MECHANISM

Donald R. De Tar, Stratford, Conn., assignor to General Electric Company, a corporation of New York Application May 8, 1936, Serial No. 78,616

9 Claims. (Cl. 74—10)

My invention relates to drive mechanisms of the variable speed type and more particularly to drive mechanisms of the type which may conveniently be employed in the adjustment of circuit elements of high frequency apparatus.

One of the objects of my invention is to improve the construction of such drive mechanisms whereby they may be more economically manufactured, are more compact when assembled, and, at the same time, are rugged and reliable in operation.

A further object of my invention is to provide an improved drive mechanism whereby the speed at which the element to be controlled is varied, and whereby "back-lash" is substantially eliminated.

Ordinarily, a high reduction drive is desired only for fine adjustment of the circuit elements of high frequency apparatus requiring relatively small movements of the control member, whereas a smaller reduction is desirable to effect larger adjustments of the circuit elements. It is an object of my invention to provide an improved form of mechanism for effecting this desired movement.

It is a further object of my invention to provide the tuning element of radio apparatus with an improved speed reduction drive mechanism whereby either a fine or a relatively coarse adjustment of said element may selectively be made.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1 and 2 illustrate one embodiment of my invention.

Figure 1:
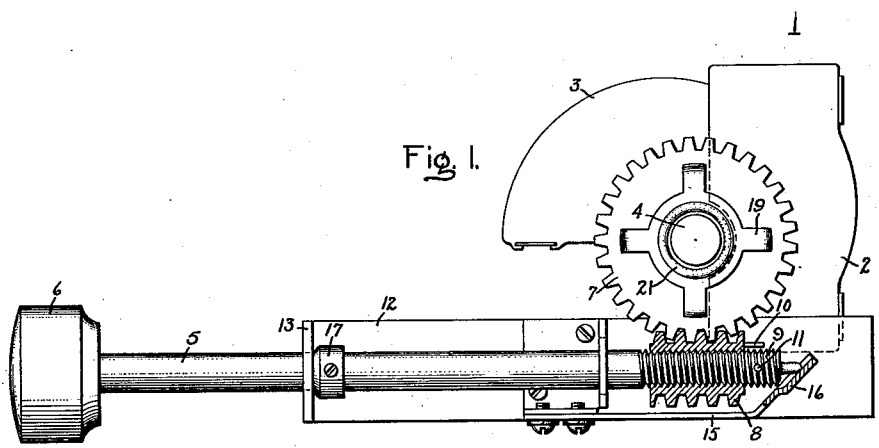
Figure 2:
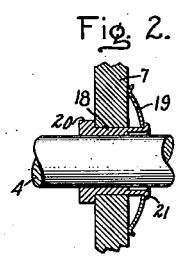

Referring now to Fig. 1 of the drawing, the arrangement illustrated therein comprises a variable condenser 1 having a plurality of stationary plates 2, and a plurality of rotor plates 3 secured on a rotor shaft 4. A manual operable control shaft 5 having an operating knob 6 secured to one of its ends, is arranged to transmit rotational motion to rotor shaft 4 through a two speed reduction drive mechanism comprising a worm wheel 7 mounted on rotor shaft 4 and secured thereto preferably through a friction clutch mechanism which will presently be described and worm 8 mounted on control shaft 5 in engagement with worm wheel 7. Worm 8 is not rigidly secured to the driving member 5 as is the customary arrangement in worm drive mechanisms, but instead is mounted on a threaded portion 9 of control shaft 5. For a reason which will presently be explained, the pitch of threaded portion 9 is short relative to the pitch of worm 8.

The shaft 5 is supported in any suitable way as by a bracket 12 which is provided at 13 with a bearing for a point of the shaft at one side of the worm and at 15 with a spring. This spring has an upturned end 16 which supports the shaft at a point on the opposite side of the worm. A thrust collar 17, secured to shaft 5, is adapted to maintain shaft 5 in desired longitudinal relationship with respect to bracket 12. The upturned end 16 of spring 15 being at an angle with respect to shaft 5 biases the shaft and worm upward against the gear 7 and at the same time holds thrust collar 17 against bearing 13. Consequently, it will be understood that this single spring eliminates all backlash from the system.

In order to cause worm 8 to rotate with control shaft 5 after a predetermined rotational movement of shaft 5, a small pin 10 is provided at one end of worm 8 and a second pin 11, adapted to coact with pin 10, is provided on shaft 5. Prior to a time when pin 10 engages pin 11, rotational movement of shaft 5 causes worm 8 to advance longitudinally of the shaft. This is by reason of the fact that the friction, existing between faces of the teeth of gear 7 and worm 8 acts at a greater radius than the frictional forces between the threaded portion of shaft 5 and the internal threads of worm 8, and hence prevents rotation of the worm. Thus, prior to the time when pin 10 engages 11 worm 8 acts as an intermediate coupling member or rack which causes rotor shaft 4 to rotate by reason of its longitudinal movement at a speed dependent upon the sized worm gear 7 and the pitch of threaded portion 9.

In Fig. 2 of the drawing I have shown in detail the friction clutch mechanism which secures worm gear 7 to rotor shaft 4 and which is adapted to prevent damage to the driven apparatus. It is obvious that the application of a relatively large force, multiplied by the mechanical advantage of the gearing at a time when the driven member is against a stop at an end position may cause serious damage to the apparatus. It has been found that a friction clutch such as the one illustrated in the drawing eliminates all possibility of damage from this source. While any suitable friction clutch mechanism may be used, it has been found that a clutch of the type shown in detail in Fig. 2 gives highly satisfactory results. This clutch comprises a hub 18 on shaft 4 upon which worm gear 7 is rotatably mounted and a spider 19 which frictionally engages worm gear 7 and hub 18. Flanges 20 and 21 are provided on hub 18 to prevent longitudinal movement of worm gear 7 and spider 19. It will readily be understood that spider 19 will slip at all torques in excess of a predetermined value and when such torques are applied worm gear 7 rotates about hub 18.

The operation of my two speed reduction drive mechanism is as follows:

Assume that the various elements of the mechanism are in the position shown in the drawing and that it is desired to change the capacity of condenser 1 by rotating plates 3 to a different position. Rotation of knob 6 by the operator in a counter-clockwise direction (looking from the knob toward the apparatus) causes worm 8 to advance along shaft 5, thereby driving rotor 3 at its "slow" speed, until pin 11 engages pin 10. Further rotation of knob 6 in a counter-clockwise direction causes worm 8 to rotate with shaft 5, thus driving rotor 3 at its "higher" speed. The operator continues to turn knob 6 until rotor 3 has slightly passed its desired new position. At this point he turns knob 6 in the opposite direction (i. e., in a clockwise direction), thereby automatically causing the drive mechanism to change to its "slow" or venier speed. That is, as soon as the direction of rotation of knob 6 is changed, pin 11 disengages pin 10 and worm 8 no longer rotates with shaft 5 but progresses longitudinally thereof by means of the fine thread thereon. By means of this "fine" adjustment, an accurate setting of condenser 1 to its new desired position may be made. The operator automatically has advantage of the "slow" speed for substantially one revolution of knob 6 in the reverse direction or in other words until pin 11 again engages pin 10.

It will be understood from the above description that I have provided a simple yet rugged two speed drive mechanism which is economical to manufacture and reliable in operation. When the drive mechanism is used in conjunction with variable tuning elements of high frequency apparatus the operator may, each time a new frequency setting is desired, rotate the driven member upon which the tuning element or elements is mounted at the "higher" drive speed until an approximate frequency setting is made. Then, by simply rotating the control knob in the opposite direction, the vernier action of the drive mechanism is automatically brought into operation. It will further be noted that I have provided a drive mechanism whose drive shaft is at right angles to the shaft upon which the driven apparatus is mounted. This permits the tuning elements such as gang condensers of high frequency apparatus to be mounted parallel to the front face of the equipment, a feature which is frequently highly desirable.

While I have shown a particular embodiment of my invention, it will of course be understood that I do not wish to be limited thereto since many modifications may be made, and I therefore contemplate by the appended claims to cover all such modifications as fall within the true spirit and scope of my invention.

What I claim as new and desire to secure by Letters Patent in the United States is:

1. The combination of a rotatable driving member with a driven member, means connected with said driven member to utilize the motion thereof, a coupling member, means for moving said coupling member axially of said driving member during a predetermined rotational movement of said driving member, and means for causing said coupling member to rotate with said driving member upon further movement of said driving member in the same direction, said coupling member being arranged to transmit both its rotational motion and its motion axially of said driving member through said driven member to said means.

2. The combination of a rotatable driving member with a worm movably mounted on said driving member, a worm gear mounted in continuous driving engagement with said worm, means responsive to a predetermined rotation of said rotatable driving member for moving said worm a predetermined distance axially of said driving member, said means causing said worm to act as a rack in driving said worm gear, and means for rotating said worm upon continued movement of said driving member in the same direction exceeding said predetermined rotation, said last-named means causing said worm to act as a worm in driving said worm gear.

3. In combination, a rotatable drive shaft having a threaded portion, a worm movably mounted on said threaded portion and provided with internal threads to engage the threads of said drive shaft, the pitch of said threads being substantially different from the pitch of said worm whereby said threads tend to move said worm axially of said drive shaft, a worm gear mounted in continuous driving engagement with said worm, and means responsive to continued rotation of said drive shaft in the same direction for limiting to a predetermined amount the said axial movement of said worm and for rotatably driving said worm with said drive shaft when said predetermined limit is exceeded, said axial and said rotatable movements of said worm being transmitted to said worm gear.

4. In combination, a rotatable drive shaft having a threaded portion, a worm mounted on said threaded portion and provided with internal threads to engage the threads of said drive shaft, the pitch of said threads being substantially different from the pitch of said worm, a worm gear mounted in engagement with said worm, means for causing said worm to rotate with said drive shaft after a predetermined rotational movement of said shaft, and a single means for biasing said shaft in the direction of said worm gear and in a direction axially of said shaft.

5. In a two speed drive for radio tuning elements and the like, the combination of a drive shaft having one portion thereof provided with screw threads, a worm mounted on said threaded portion and provided with internal threads to engage the threads of said drive shaft, the pitch of said threads being substantially different from the pitch of said worm, a driven member, a worm gear mounted in engagement with said worm, means including a friction clutch for connecting said worm gear to said driven member, a pin secured to the end of said worm and extending out in a longitudinal direction therefrom, and a second pin secured to said drive shaft and adapted to engage said first pin after a predetermined rotational movement of said drive shaft.

6. In a two speed drive, the combination of a stationary member including a thrust and guide bearing and a second bearing, a rotatable driving member mounted in said bearing, a thrust collar secured to said driving member and adapted to coact with said thrust and guide bearing, a worm mounted on said driving member, a driven member, a worm gear secured to said driven member, means for causing said worm to move longitudinally of itself during a predetermined range of rotational movement of said driving member, means for causing said worm to rotate with said driving member upon movement in excess of said predetermined range, and means for applying a biasing force through said second bearing in a direction between a line extending back along said driving member toward said thrust and guide bearing and a line extending from the center of said worm gear perpendicular to the axis of said driving member.

7. In combination, a drive shaft, a worm gear, a worm threaded to said shaft and continuously engaging said worm gear, means to restrain said worm against rotation with said shaft, said means causing said worm to thread axially of said shaft and rotate said worm gear at low speed, and means to rotate said worm with said shaft, said last-named means causing said worm to rotate said worm gear at high speed.

8. In combination, a worm gear, a shaft, a worm interiorly threaded to said shaft and exteriorly engaging in continuous driving relation said worm gear, the interior radius of said worm being sufficiently smaller than the exterior radius thereof that during rotation of said shaft said worm is held against rotation by its engagement with said worm gear whereby upon rotation of said shaft said worm moves axially thereof to drive said worm gear at low speed, and means to rotate said worm with said shaft thereby to drive said worm gear at high speed.

9. In combination, a shaft, a worm mounted on said shaft, a worm gear meshing in continuous driving relation therewith, means to move said worm longitudinally of the axis of said shaft thereby to act as a rack in driving said worm gear, and means to rotate said worm about the axis of said shaft thereby to act as a worm in driving said worm gear.

DONALD R. DE TAR.